United States Patent [19]
Putnam

[11] Patent Number: 4,537,044
[45] Date of Patent: Aug. 27, 1985

[54] FOOD STORAGE CONTAINER

[76] Inventor: David Putnam, Mohawk St. and Keystone Ave., Sayre, Pa. 18840

[21] Appl. No.: 690,778

[22] Filed: Jan. 11, 1985

[51] Int. Cl.³ .............................................. F25D 3/08
[52] U.S. Cl. ..................................... 62/371; 62/457; 220/902
[58] Field of Search ........................ 62/457, 464, 371; 220/23, 215, 902, 331; 16/115; 165/75

[56] References Cited
U.S. PATENT DOCUMENTS 2,652,698 9/1953 Schlumbohm ...................... 220/23
3,387,650 6/1968 Hoffmann et al. ................ 62/457 X
3,482,418 12/1969 Moore ................................. 62/457
4,322,954 4/1982 Sheehan et al. .................. 62/457 X Primary Examiner—Lloyd L. King
Attorney, Agent, or Firm—Bauer & Amer

[57] ABSTRACT

A picnic or similar type food storage container that uses a selected appropriate source for either heat or cold input to the food, in which the source is properly below the food in the heating mode, and above the food in the cooling mode, to thereby provide an enhanced temperature control over the food.

5 Claims, 7 Drawing Figures

FOOD STORAGE CONTAINER

The present invention relates generally to improvements for picnic food containers and the like, wherein the improvements significantly enhance the capacity of the container to maintain the food either warm or cold, as required for the proper storage thereof.

It is already well known and described in the patent literature, as exemplified by U.S. Pat. No. 3,387,650 to provide storage containers for picnic or similar uses having a food-warming mode (FIG. 3) or a food-cooling mode (FIG. 4). While the effectiveness of these prior art devices is understandably related to the insulation used therein, and the sources used for heating and cooling, when there has been unsatisfactory performance, the problems have attempted to be alleviated by increasing the insulation or improving the output of the sources, either or both of which are expensive.

Broadly, it is an object of the present invention to provide a more effective "hot" or "cold" food storage container or chest which, while still economically priced, overcomes the foregoing and other shortcomings of the prior art. More particularly, it is an object to provide a combination cooler and thermal type chest, which without increase in insulation or modification in the food temperature-controlling source, has a significantly enhanced effectiveness in maintaining temperature control over the food stored therein.

In a food storage container of the type having a main housing bounding a food storage compartment and means for selectively providing an input either of heat or cold to the food contents therein, the improvements to said container which demonstrate objects and advantages of the present invention include an auxiliary housing formed on one end of the main housing which bounds an operative compartment in adjacent heat and cold transferring relation to the food storage compartment. On the auxiliary housing is a first lid which opens into the operative compartment and is thus advantageously used for selectively inserting thereinto a source of heat or cold, as required for proper storage of the food. On the other or opposite end of the main housing is a second lid which is opened to selectively insert thereinto food contents requiring an input of heat or cold. Completing the construction of the container is a handle movable into first and second container-carrying positions, said first handle position establishing an orientation of the container in which a cold source is in the auxiliary housing operative compartment and is thus above the food storage compartment for advantageously transferring cold in a descending direction thereto, whereas said second handle position establishes a 180 degree reversal in orientation of the container in which a heat source is in the auxiliary housing operative compartment and is, therefore, below said food storage compartment for advantageously transferring heat in an ascending direction thereto. Thus, with comparable prior art insulation and no modification of the temperature controlling source, the efficiency of the transfer to the food contents of either heat or cold in the within inventive container is enhanced by the container orientation and by the direction of the transfer.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 4:
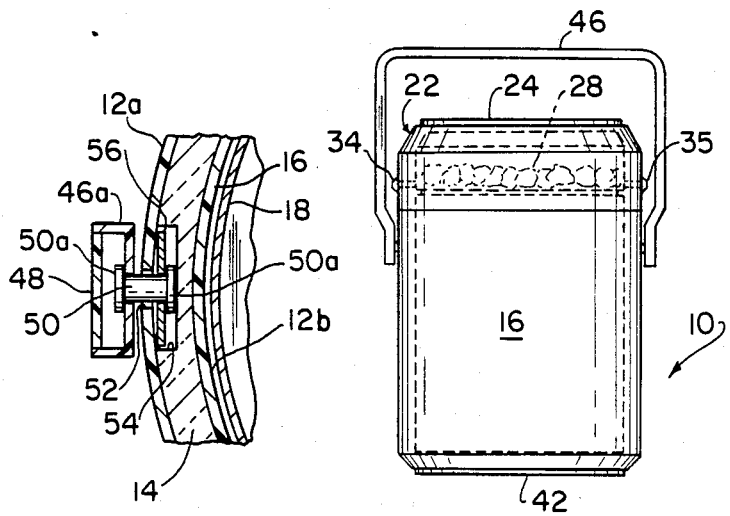
Figures 2, 3:
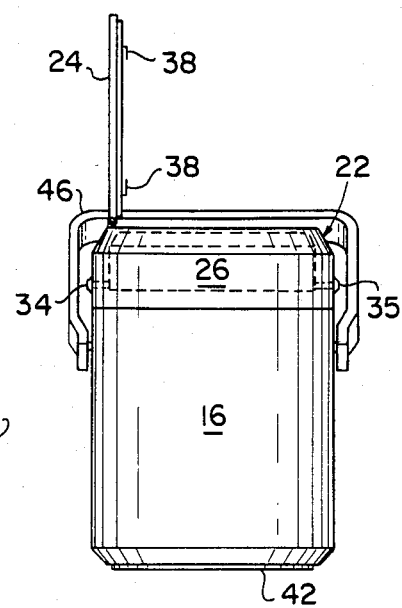
FIG. 2 is a partial plan view, in section, taken long line 2—2 of FIG. 1, showing details of the sliding carrying handle of the container.
FIG. 3 is a view similar to FIG. 1, but on a reduced scale, illustrating the facilitated manner in which the container is transported when containing food contents requiring a cold input for proper storage.
Figure 5:
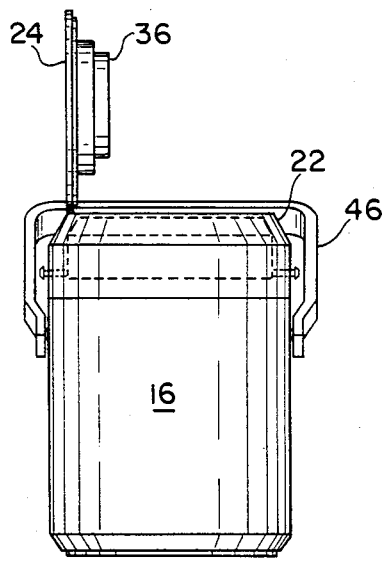
Figure 6:
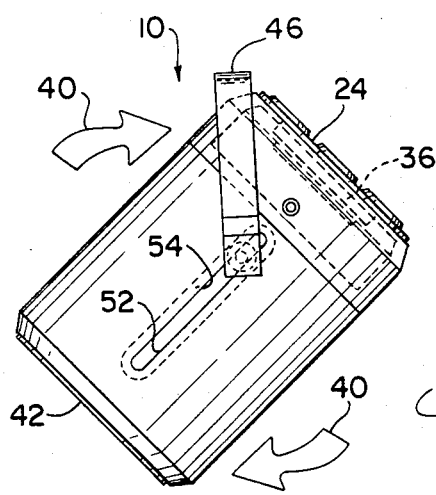
Figure 7:
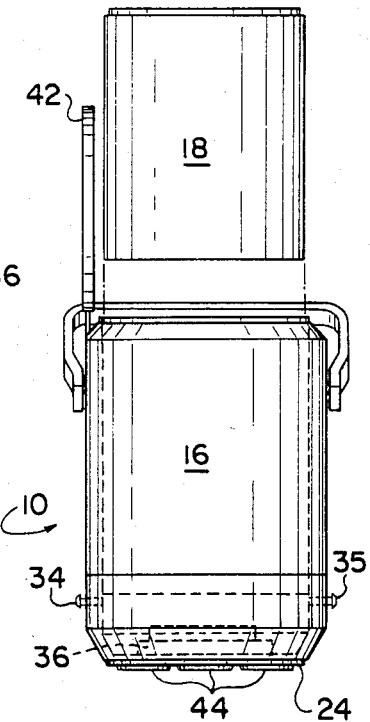

FIG. 4, like FIG. 3, is a front elevational view of the container, but illustrating the manner in which the container is conveniently equipped with either a heat or a cold source;

FIG. 5 is a further front elevational view on a reduced scale of the within inventive container, but illustrating the functioning of its components preparatory to switching from a cold to a heat-inputting source;

FIG. 6 illustrates the container in the same front elevational view perspective, but illustrating how it is rotated 180 degrees to maximize the efficiency of providing a heat input to the food contents; and FIG. 7 is also a reduced scale front elevational view of the container, and illustrates the facilitated manner in which selected food contents are inserted therein.

Figure 1:
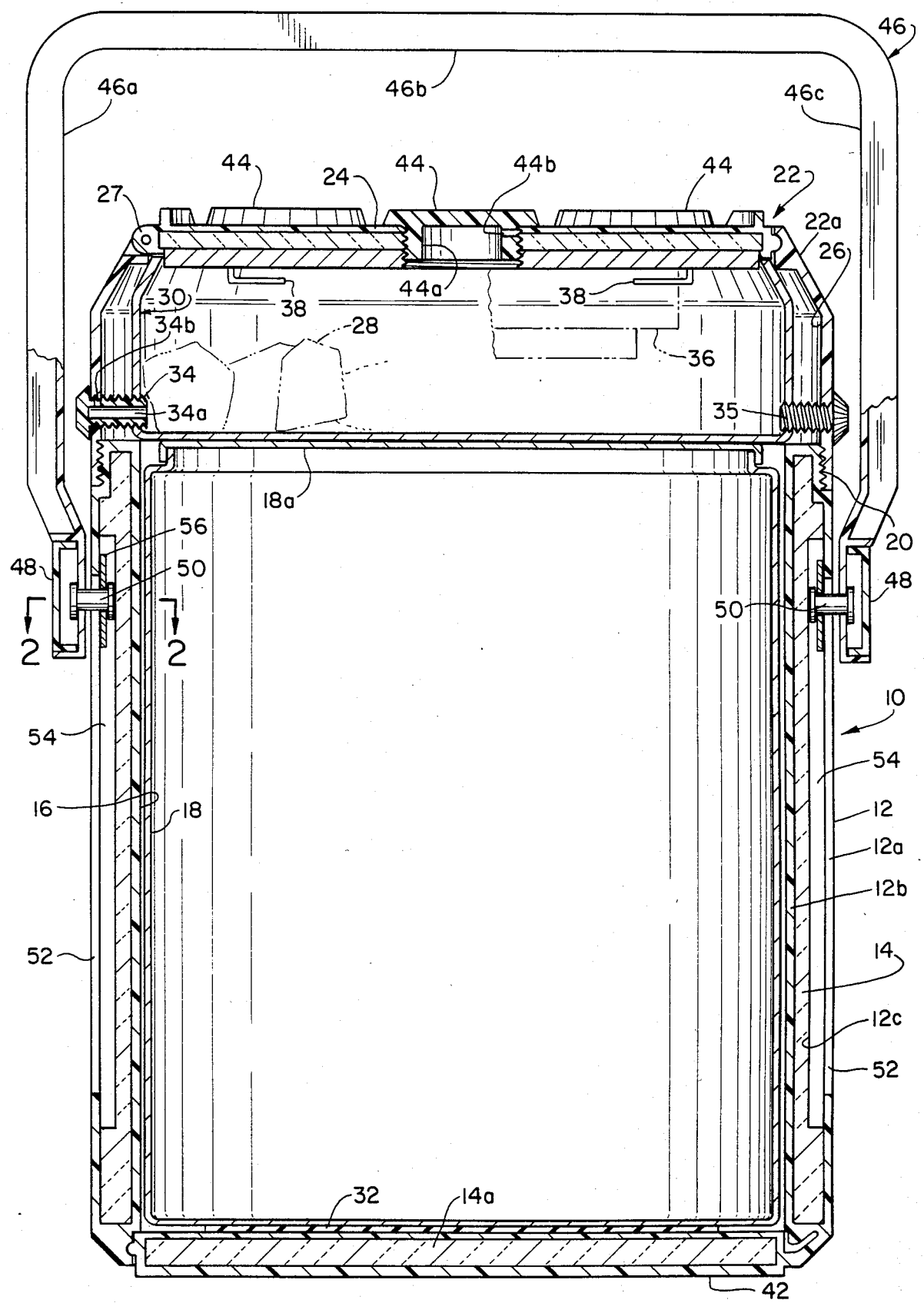
FIG. 1 is a detailed vertical cross section of the inventive food storage container hereof.

Illustrated in FIG. 1 is a food storage container, generally designated 10, of the well known type that is used for transporting and storing food for picnics and other such events. In this product classification, it is desirable for maximum utility that the container be capable of use with foods that for proper storage require either an input of heat or of cold.

Theoretically, an object is maintained "cold" not by any input thereto, but by removing heat therefrom, but for simplification which does not adversely affect an understanding of the within invention, an object that is maintained "cold" will be indicated as achieving this condition as a result of input from a source of coldness. Stated somewhat differently, and as will appear from the description which follows, heat is transferred from surrounding air to the source of coldness, i.e. so called dry ice, thus rendering said air "cold" and causing it to descend from an upper compartment to a lower food storage compartment to thus cool the food contents in said food compartment. For simplicity, this process will be deemed to be providing a cold input to the food having a direction which is descending in nature.

Container 10 is thus in many respects constructed according to the prior art so as to be usable for foods requiring either coldness during storage, or heat during storage. To this end, container 10 has a cylindrical main housing 12 preferably constructed of plastic, which consists of inner and outer cylindrical walls 12a and 12b which bound therebetween a circular compartment 12c that is filled with an appropriate insulation material 14 which minimizes the loss of heat from the container 10, or which obviates any adverse effect of ambient heat on the contents of the food being stored within the container 10. This same well known prior art double-wall technique is used in other components of the container 10 to provide an appropriate compartment for additional insulation such as insulation 14a in the bottom of the container and 14b in the top of the container, so that container 10 is fully insulated against heat loss and heat penetration.

The inner cylindrical wall 12b of the main housing 12 bounds a food storage compartment 16 which, in practice, receives an appropriately sized metal food container 18 having a friction fitting lid 18a. Selectively disposed or stored within the container 18 are the foods which require either a heat or cold input, as previously discussed.

External wall 12a of the main housing 12 is molded with threads 20 at its upper end which cooperate to threadably engage with threads of an auxiliarly housing, generally designated 22. A main component of the auxiliary housing 22 is a first lid 24, pivotally mounted as at 27, and having the previously noted double wall construction which accommodates the previously noted insulation 14b. The side wall 22a of housing 22 bounds an internal operative compartment 26 in which there is positioned either a heat source or cold source depending, of course, on what is appropriate for the food contents within the food storage compartment 16.

Still referring to FIG. 1, and assuming that the stored food contents requires a cold input, an appropriate source thereof would be dry ice 28 (illustrated in phantom perspective in FIG. 1) which, in practice, is preferably stored in an open metal tray 30 which is supported on the food container lid 18a. To ensure that the weight of the tray 30 and dry ice 28 is supported by the container 18 use may be made of a spacing pad 32 strategically located beneath the bottom of the container 18.

At this point in the description it should be noted that it is not only a departure from the prior art, but an important operating parameter that the compartment 26 in the auxiliary housing 22 is in adjacent position to the food storage compartment 16 and that the dry ice 18 or other appropriate "cold" source is above the food storage compartment 16. As a result, cold input to the food contents within the food storage compartment 16 is in a descending direction which, it should be readily recognized, is the direction most favorable for properly maintaining the food contents within the food storage compartment 16 in a "cold" condition.

At this point in the description it is also convenient to note that auxiliary housing 22 has two side vent members 34 and 35 which may be either threadably or slidably disposed in this housing. Both are identically constructed and include a central passage 34a and a radial exit opening 34b. Thus, slight withdrawal outwardly of the vent member 34 (and also of vent member 35) will expose the opening 34b which then conveniently permits draining of any fluid resulting from the melting of the dry ice 28 or conventional ice source. The same vent members 34, 35 also effectively serve as a convenient vent to atmosphere of air and combustion products when the operative compartment 36 of the auxiliary housing 22 is used for a heat source.

If it is now assumed that container 10 is to be used for food requiring a heat input, this change is readily made in a few simple steps. Starting with container 10 in the condition illustrated in FIG. 3 in which it will be understood to be in a vertical orientation that strategically locates the cold source 28 above the food storage container 16, to convert to a heat source, and as illustrated in FIG. 4, the first lid 24 of auxiliary housing 22 is opened thereby providing access into the operative compartment 26 of the auxiliary housing 22 for removal of the cold source 28. Next, and as shown in FIG. 5, an appropriate heat source 36, which may be a hand warmer designated "John-E GI Hand Warmer", by Alladin Manufacturing Co., of Minneapolis, Minn. is connected to the lower surface of lid 24. As best shown in FIG. 1, to which figure reference should again be made, the attachment of the heat source 36 in depending relation from the lid 24 is readily accomplished using hooks 38.

Following the closing of the lid 24, the container 10 is then rotated 180 degrees, as illustrated by the directional arrow 40. As a result, the heat source 26 is located at the bottom of the container 10 and thus below the food storage compartment 16, all as illustrated in FIG. 7. This is significant since the heat input to the food content within the food storage compartment 16 is in an ascending direction, which it will be understood is the direction most favorable for heat transfer from the heat source 26 to the food within the compartment 16. In addition to using heat source 26 to maintain food "warm", said source can be appropriately selected to generate sufficient heat to also provide a cooking function.

Since it is preferred in accordance with the present invention to topload the container 10, the next step is pivotally unlatching a second lid 42 of the container 10 which is now located at the top of the container and thus in a reverse position than that illustrated in FIG. 1. In the open position of the lid 42, the food container 18 is removed and the food contents thereof which require an input of cold is replaced with food requiring an input of heat, and the container 18 is then inserted back into the food storage compartment of the container 10.

As already noted, since the food container 18 is above the heat source 26, the heat transfer is in a favorable ascending direction.

Reference should again be made to FIG. 1 which best illustrates cooperating components of the container 10 which contribute to the use thereof when used in conjunction with a heat source. Threadably disposed in a concentric or triangular fashion in the lid 24 are identically constructed members 44 which have a central opening 44a and a radial opening 44b. The top surface of each member 44 will be understood to be circular and of a sufficient area so that when in surface contact with a support surface, the container is in a stable and balanced condition when the feet 44 are in their depending relation from the container 10 as illustrated in FIG. 7. Also in said FIG. 7 condition, each member 44 will be unthreaded a slight amount so as to expose its radial opening 44b. As a result, there will be an air flow through each member 44 into the operative compartment 26 and thus there will be an oxygen supply for the heat source 36. A vent opening for the combustion products of the heat source 36 is of course through the previously noted vents 34, 35.

Still referring primarily to FIG. 1, but this time in conjunction with FIG. 2, it will now be explained how the container 10 is provided with a carrying handle 46 which effectively assumes a carrying position when the auxiliary housing 22 is at the top of the container and also when it is at the bottom. Handle 46 is formed of three legs, 46a, 46b and 46c which cooperate to form a U-shape. The free ends of legs 46a and 46c have a recess and cap arrangement 48 which enables the positioning in said recess of a laterally extending pivot 50. More particularly, and as best illustrated in FIG. 2, the extending portion of pivot 50 is through a vertical slot 52 in the housing external wall 12a and into a slightly wider slot or track 54 in the insulation 14. To retain the position of the pivot 50 use is made of a washer 56 in a retaining position in front of an enlarged diameter end 50a of the pivot, while the opposite enlarged end 50a performs the same function with respect to each leg 46a, 46c. As a result of the pivot pin connection of the legs 46a, 46c of the handle 46 to the container 10, as just described in connection with FIG. 2, the handle 46 is of course rotatable about the pivot 50 and also is slidable in opposite directions along the length of the track 54. These two degrees of movement of the handle 46 are best understood from FIG. 6 which illustrates the handle in a partially rotated condition and also in a condition of sliding movement partially along the track 54.

From what has been described, it should be readily appreciated that the food storage container 10 is uniquely adapted for storing foods requiring either an input of heat or of cold. More particularly, it is a significant contribution of the present invention that when the container 10 is used for providing an input of heat to food, that the heat source is below the food so that the heat transfer is in an ascending direction. When used for foods requiring "cold", the within container has an orientation in which the source of the cold is above the food so that the transfer therefrom is in a descending direction.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. In a food storage container of the type having a main housing bounding a food storage compartment and means for selectively providing an input either of heat or cold to the food contents therein, the improvements to said container comprising an auxiliary housing formed on one end of said main housing bounding an operative compartment in adjacent heat and cold transferring relation to said food storage compartment, a first lid for an opening into said auxiliary housing operative compartment for selectively inserting thereinto a source of heat or cold, a second lid for an opening into said food storage compartment from the end opposite from said auxiliary housing for selectively inserting thereinto food contents requiring an input of heat or cold, and a handle movable into first and second container-carrying positions, said first handle position establishing an orientation of said container in which a cold source is in said auxiliary housing operative compartment and is above said food storage compartment for transferring cold in a descending direction thereto, said second handle position establishing a 180 degree reversal in orientation of said container in which a heat source is in said auxiliary housing operative compartment and is below said food storage compartment for transferring heat in an ascending direction thereto, whereby the efficiency of the transfer to said food contents of either heat or cold is enhanced by the container orientation and the direction of said transfer.

2. A food storage container as claimed in claim 1, wherein said main housing and said auxiliary housing are threadably connected to each other, and said first lid is pivotally connected to said auxiliary housing.

3. A food storage container as claimed in claim 2, wherein said main housing has vertically oriented tracks on opposite sides thereof, and said handle has three legs defining a U-shape and has the free ends of two of said legs slidably disposed in said tracks, so as to be adapted to assume said first and second carrying positions.

4. A food storage container as claimed in claim 3, wherein said first lid has heat source engaging hooks on its inner surface to engage and hold said heat source during the 180 degree reversal and orientation in said container.

5. A food storage container as claimed in claim 4, wherein said auxiliary housing has first and second vent openings therein, said first vent opening serving both as an exit for fluid discharge of said cold source and as an air exit for said heat source, and said second vent openings serve as an air inlet for said heat source.

* * * * *